United States Patent [19]

Langosch et al.

[11] Patent Number: 5,320,501

[45] Date of Patent: Jun. 14, 1994

[54] ELECTRIC MOTOR DRIVEN HYDRAULIC APPARATUS WITH AN INTEGRATED PUMP

[75] Inventors: Otto P. Langosch, Rochester; Albin J. Niemiec, Sterling Heights; Ronald B. Schweiger, Clawson, all of Mich.

[73] Assignee: Vickers, Incorporated, Troy, Mich.

[21] Appl. No.: 787,670

[22] Filed: Nov. 4, 1991

Related U.S. Application Data

[63] Continuation-in-part of Ser. No. 687,173, Apr. 18, 1991, Pat. No. 5,181,837.

[51] Int. Cl.⁵ .............................................. F04B 35/04
[52] U.S. Cl. .................... 417/415; 417/203; 417/357; 417/542
[58] Field of Search .............. 417/203, 205, 357, 415, 417/423.1, 423.3, 423.6, 540, 542, 312

[56] References Cited

U.S. PATENT DOCUMENTS

| | | |
|---|---|---|
| 2,810,348 | 10/1957 | White . |
| 2,825,286 | 3/1958 | White . |
| 2,961,149 | 11/1960 | Hull ...................... 417/542 |
| 3,094,272 | 6/1963 | McClure ................ 417/350 |
| 3,315,604 | 4/1967 | Roeske .................. 417/201 |
| 3,667,870 | 6/1972 | Yoshida et al. ........ 417/357 |
| 3,672,793 | 6/1972 | Yowell .................. 417/203 |
| 3,897,178 | 7/1995 | Palloch ................. 417/368 |
| 4,050,263 | 9/1977 | Adalbert ............... 417/205 |
| 4,108,574 | 9/1978 | Bartley ................. 417/54 |
| 4,229,142 | 10/1980 | LeDall .................. 417/250 |
| 4,255,098 | 3/1981 | Hertell .................. 417/372 |
| 4,281,971 | 8/1981 | Koons ................... 417/203 |
| 4,657,487 | 4/1987 | Schonwald ............ 417/372 |
| 4,699,570 | 10/1987 | Bohn ..................... 417/69 |
| 4,832,575 | 5/1989 | Miller ................... 417/53 |
| 4,950,133 | 8/1990 | Sargent ................. 417/312 |
| 5,189,754 | 3/1993 | Sauter ................... 417/312 |

FOREIGN PATENT DOCUMENTS

| | | |
|---|---|---|
| 2331917 | 1/1975 | Fed. Rep. of Germany ...... 418/203 |
| 1602237 | 5/1978 | Fed. Rep. of Germany . |
| 3807462 | 3/1988 | Fed. Rep. of Germany . |

Primary Examiner—Richard A. Bertsch
Assistant Examiner—Charles G. Freay
Attorney, Agent, or Firm—Barnes, Kisselle, Raisch, Choate, Whittemore & Hulbert

[57] ABSTRACT

An electric motor driven inline hydraulic apparatus comprising a housing having end members closing said housing, an electric motor stator mounted in said housing, an electric motor rotor, a shaft on which the rotor is mounted is journalled in the housing and a pump is integrally formed on one or both of the end members. The shaft extends through an opening in the end member and is connected to the rotating group of the pump. Hydraulic fluid is supplied to the interior of the electric motor housing and flows through passages in the housing to the intake of the pump integral with the end member. The end member associated with the pump is formed with an enlarged chamber adjacent the inlet of the pump which functions to reduce the flow velocity and separate the contained air from the hydraulic fluid thereby reducing the operating sound level of the pump.

25 Claims, 7 Drawing Sheets

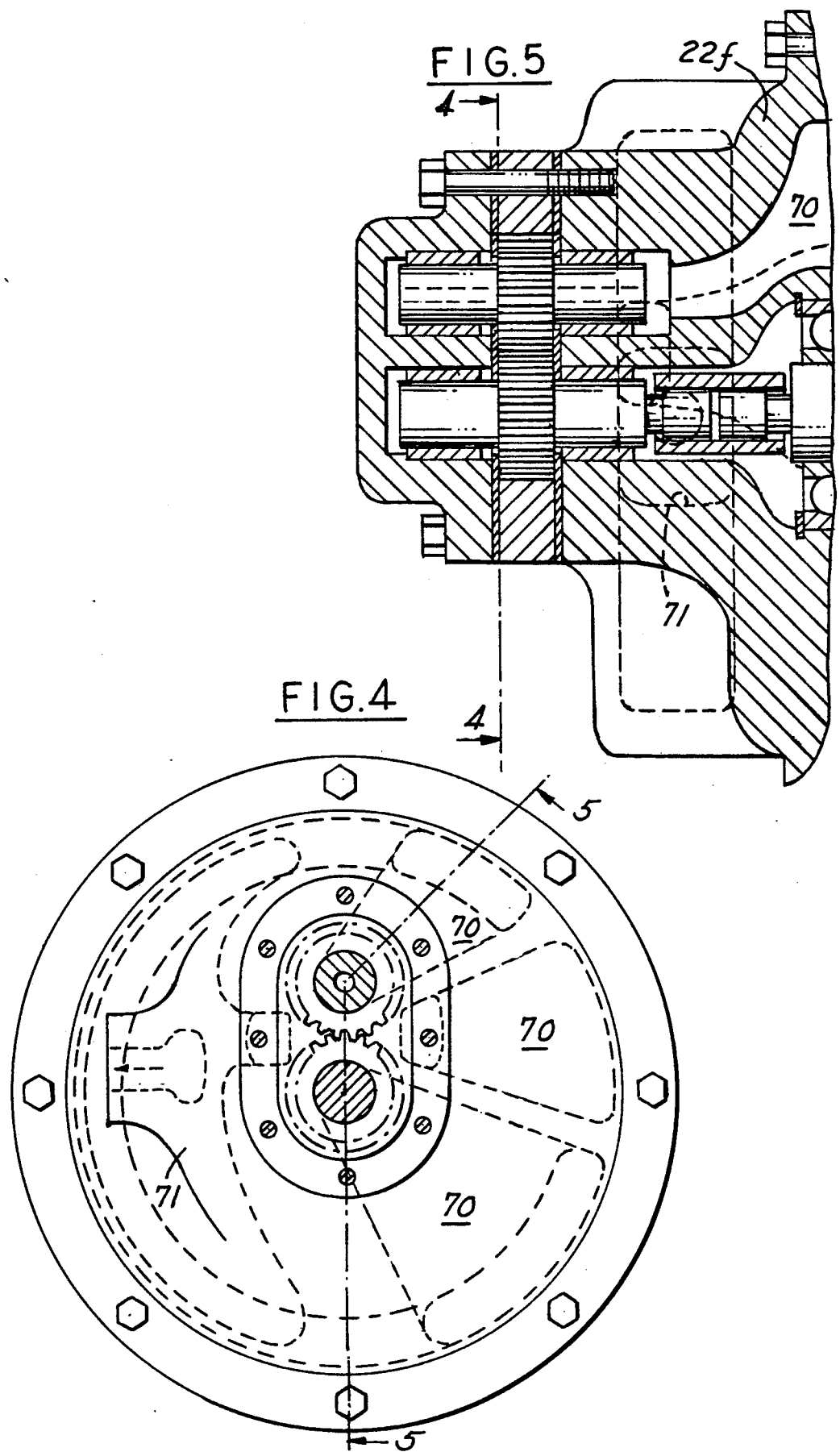

ELECTRIC MOTOR DRIVEN HYDRAULIC APPARATUS WITH AN INTEGRATED PUMP

This application is a continuation-in-part of application Ser. No. 07/687,173, filed Apr. 18, 1991, now U.S. Pat. No. 5,181,837, issued Jan. 26, 1993, having a common assignee with the present invention.

This invention relates to power transmissions and particularly to electric motor driven hydraulic pumps.

BACKGROUND AND SUMMARY OF THE INVENTION

In hydraulic pumps which are driven by an electric motor, it has been common to provide an electric motor in one housing and the hydraulic pump in another housing with the two housings positioned in line so that the motor and pump have their own sets of bearings and shafts that are usually engaged through internal and external splines or through flexible couplings. Such an arrangement is axially long and necessitates the use of mounting brackets and alignment guides.

As shown in U.S. Pat. No. 4,729,717, an electric motor driven inline hydraulic pump comprises a common housing, a stationary shaft mounted in said housing and piston type spaced pump cylinder block subassemblies that rotate around and are mounted on the shaft. Each subassembly includes a cylinder block and a plurality of circumferentially spaced pistons. The cylinder block subassemblies are positioned such that the pistons of one subassembly extend toward the other subassembly. A common yoke plate is mounted between the two cylinder blocks and bears the two groups of piston shoes, one on each of its two bearing surfaces. Each cylinder block is driven independently of and in a direction opposite the other by an electric motor integrally mounted such that its hollow rotor houses the block and drives it. All components described above are contained in one housing and operate submerged in hydraulic fluid.

The aforementioned electric motor driven inline hydraulic pump provides an electric motor and pump embodied in the same housing and coupled directly without a rotating shaft; which utilizes a simple stationary shaft that is readily made and yet maintains an accurate support for the rotating pump components; which is relatively simple, axially compact and rugged in construction; which is less costly to manufacture; which reduces the audible noise; which results in equal and opposite radial and axial forces on the yoke plate thereby reducing its stresses and the force on the supporting pintle bearings to a negligible value; which results in smaller yoke spring and yoke control piston; which eliminates dynamic seals; which readily achieves a constant power operation without the aid of a compensator valve for this region; which automatically destrokes the yoke during starting should the pressure rise faster than the motor speed; which efficiently dissipates heat from the electric motor permitting the use of smaller and lighter motors capable of large overloads for short duration.

In the aforementioned patent application Ser. No. 07/687,173 U.S. Pat. No. 5,181,837 incorporated herein by reference, there is shown and claimed a combined electric motor and pump which has the aforementioned advantages but in addition permits the pump to be entirely submerged within the hydraulic fluid interior of the housing; which is applicable to electric motors of various types such as induction electric motors, permanent magnet motors, brushless motors; and which can be adapted to various startup and speed, rotor position, pressure and fluid temperature sensing.

In accordance with the aforementioned application, the electric motor driven inline hydraulic apparatus comprises a housing having end members closing said housing, an electric motor stator mounted in said housing, an electric motor rotor, a shaft on which the rotor is mounted is journalled in the housing and a pump is integrally formed on one or both of the end members. The shaft extends through an opening in the end member and is connected to the rotating group of the pump. Hydraulic fluid is supplied to the interior of the electric motor housing and flows through passages in the housing to the intake of the pump integral with the end member. The end member associated with the pump is formed with an enlarged chamber adjacent the inlet of the pump which functions to reduce the flow velocity and separated the contained air from the hydraulic fluid thereby reducing the operating sound level of the pump.

Among the objectives of the present invention are to provide a combined electric motor and pump wherein a pump is integrated into one or both end members of the electric motor housing; wherein the electric motor housing and end member are constructed and arranged to stabilize and condition the flow of hydraulic fluid into the pump; and wherein the pump may comprise a piston pump, vane pump or gear pump, or combinations thereof.

DESCRIPTION OF THE DRAWINGS

FIG. 4 is an end view of a further modified form of the apparatus.

FIG. 5 is a longitudinal sectional view taken along the line 5—5 in FIG. 4.

DESCRIPTION

Figure 1:
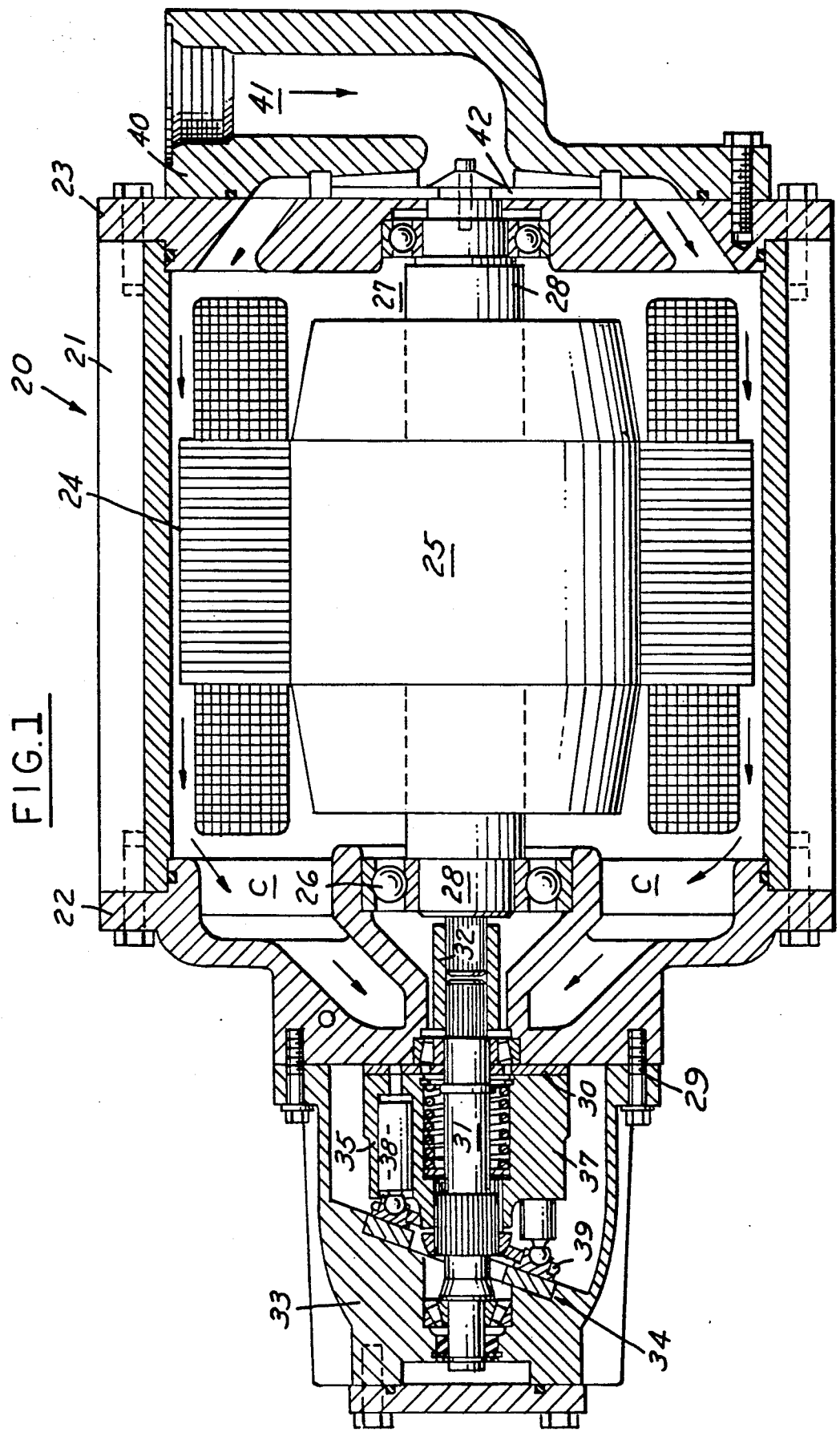
FIG. 1 is a longitudinal part sectional view of an electric motor driven inline hydraulic apparatus embodying the invention.

Referring to FIG. 1, an electric motor driven inline hydraulic apparatus 20 comprises a housing 21, end plates or end members 22, 23 and an electric motor within the housing which includes a stator 24 and a rotor 25. The rotor 25 is rotatably mounted by bearings 26, 27 on a shaft 28, the bearings being mounted on end members 22, 23.

A fixed displacement axial piston pump is integrated with end member 22. The end member 22 includes an end surface 29, a valve plate 30 fixed in oriented position on the surface 29 to provide for inlet of hydraulic fluid, as presently described. A pump shaft 31 is coupled to shaft 28 of the electric motor through a coupling 32. The fixed displacement axial piston pump is substantially such as shown in U.S. Pat. No. 3,778,202 incorporated herein by reference, and comprises a housing 33 which is bolted to the end member 22 and encloses a thrust plate 34 which is fixed against rotation and rotatably supports a rotating group 35. The rotating group 35 includes a rotating cylinder block 37 in which axially extending pistons 38 extend from cylindrical cavities in the cylinder block 37 and engage a shoe assembly 39, which in turn is in contact with the inclined surface of the thrust plate 34. Upon rotation of the rotating group 35, fluid is drawn into the cylinders in which the pistons 38 operate and subsequently forced out of the cylinders for discharge.

An inlet housing 40 is provided on end member 23 and includes a radial hydraulic fluid inlet 41. When the electric motor is energized, the electric rotor 25 is rotated and the pump is caused to draw fluid from the interior of the housing 21 and a flow is established, as shown by the arrows, about the stator 24 through spaces between the inner surface of the housing 21, through passages in the rotor 25 to inlet passages in the end member to the pump. An impeller 42 is fixed on the opposite end of shaft 25 to facilitate flow. Further in accordance with the invention, end member 22 provided with a large volumetric inlet chamber C, as presently described adjacent to the inlet of the pump to provide a quiescent port of hydraulic fluid without bubbles adjacent the inlet to the pump. This is augmented by the large mass of fluid in the electric motor. Tests conducted on an apparatus without a chamber in the end member have shown that a combined electric motor and pump wherein the electric motor is submerged in hydraulic fluid functions as substantially reduced noise levels. The presence of the additional volume of fluid adjacent the pump inlet assists in further conditioning the inlet flow to further reduce the pump operating sound level.

Figure 8:
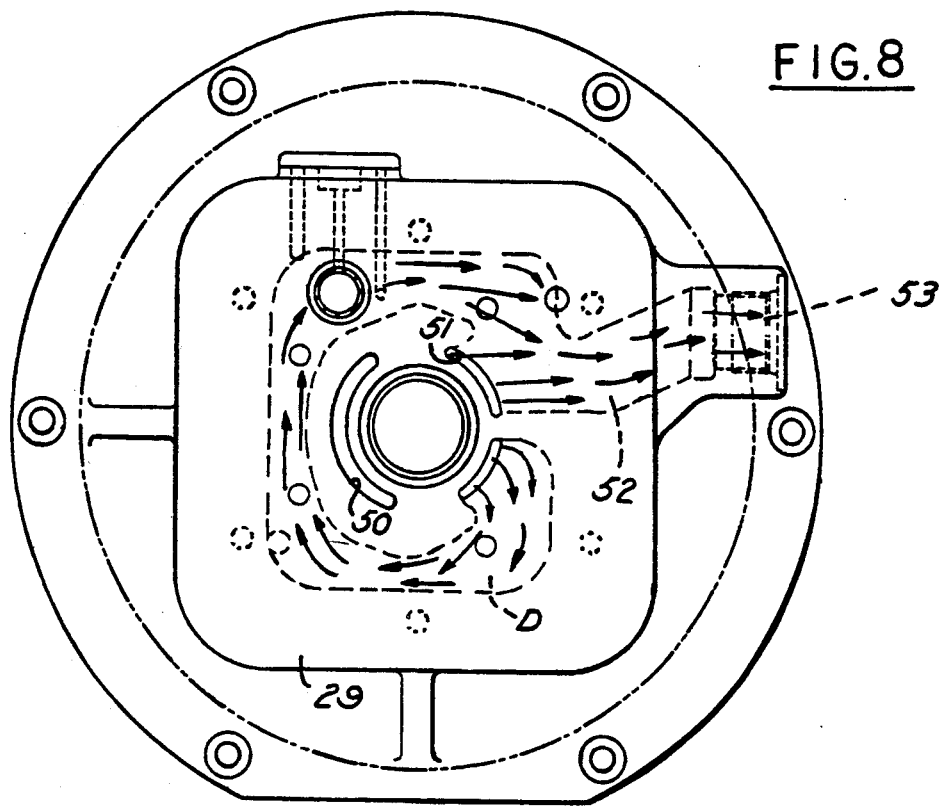
FIG. 8 is a view of a modified end member.
Figure 9:
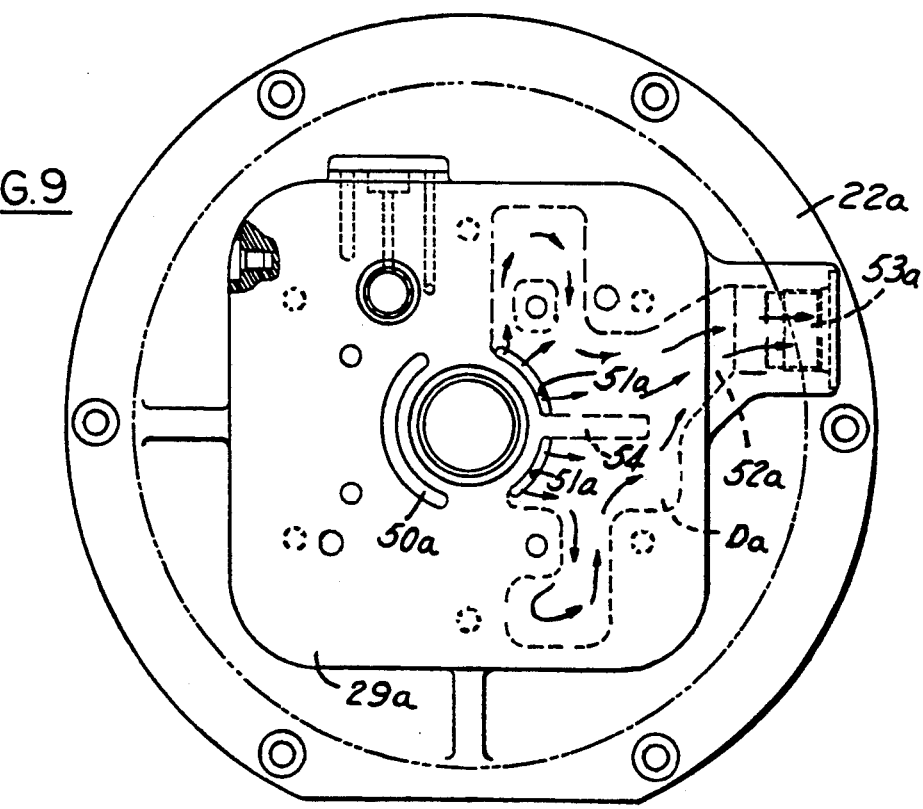
FIG. 9 is a view similar to FIG. 8 of another form of end member.
Figure 10:
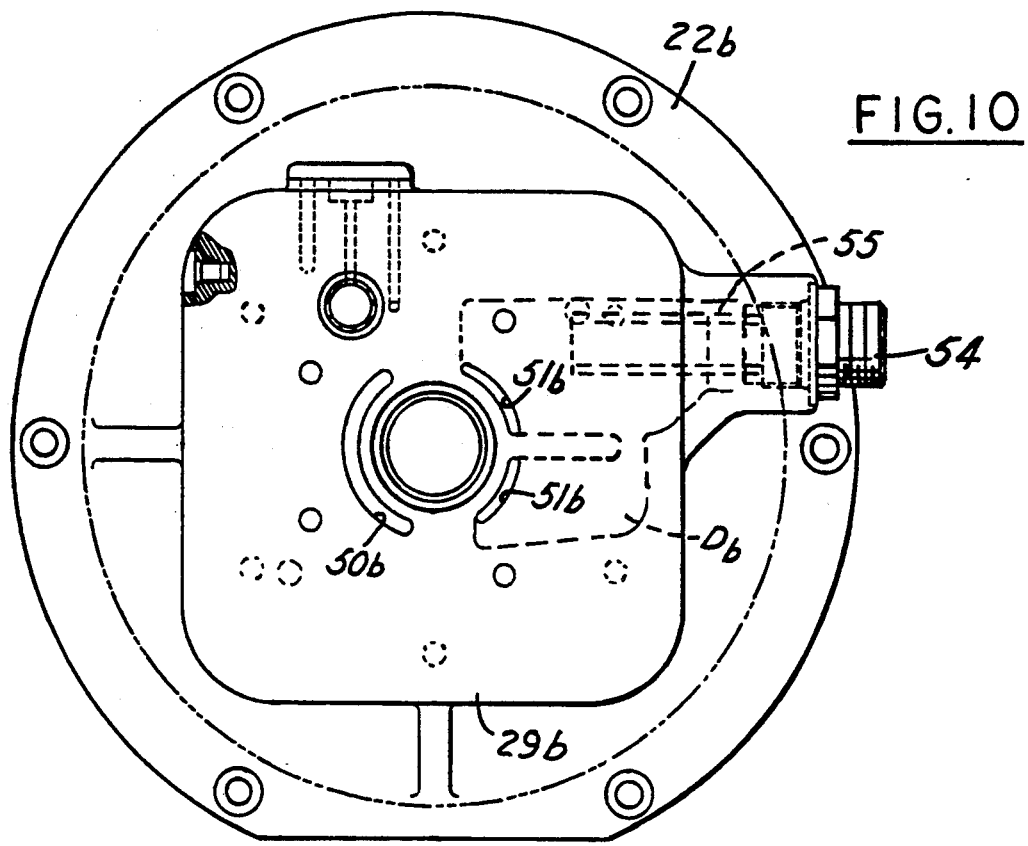
FIG. 10 is a view similar to FIG. 8 of a further form of end member.

The configuration of the discharge chamber D in the end member 22 may have different configurations as shown in FIGS. 8-10.

As shown in FIG. 8, the end member 22 comprises the aforementioned valve surface 29 that has an inlet passage 50 to the pump and discharge passages 51 to an expansion chamber D that extends circumferentially or over 180° and communicates with a discharge passage 52 to an outlet 53.

As shown in FIG. 9, in the form of end member shown in FIG. 9, the end member 22a includes a valving surface 29a having an inlet 50a and outlets 52a that communicate with a chamber Da that extends for about 180° to an discharge passage 52a to an outlet 53a, as shown by the arrows. A stiffening rib 54 functions to separate the outlet from spaced outlets 51a and then permit the flow to minimize turbulence and to smoothly join minimizing pulsations and associated sound.

As shown in FIG. 10, end member 22b includes a valving surface 29b with inlet passage 50b and outlet passages 51b with a chamber Db which extends about 180° but is smaller then that shown in FIG. 9. A pipe resonator tube 55 extends into the chamber Db and cooperates with the chamber Db to provide the desired and diminution in the fluid-borne noise level of the exhaust. A threaded connector 54 is shown in the discharge port.

Figure 11:
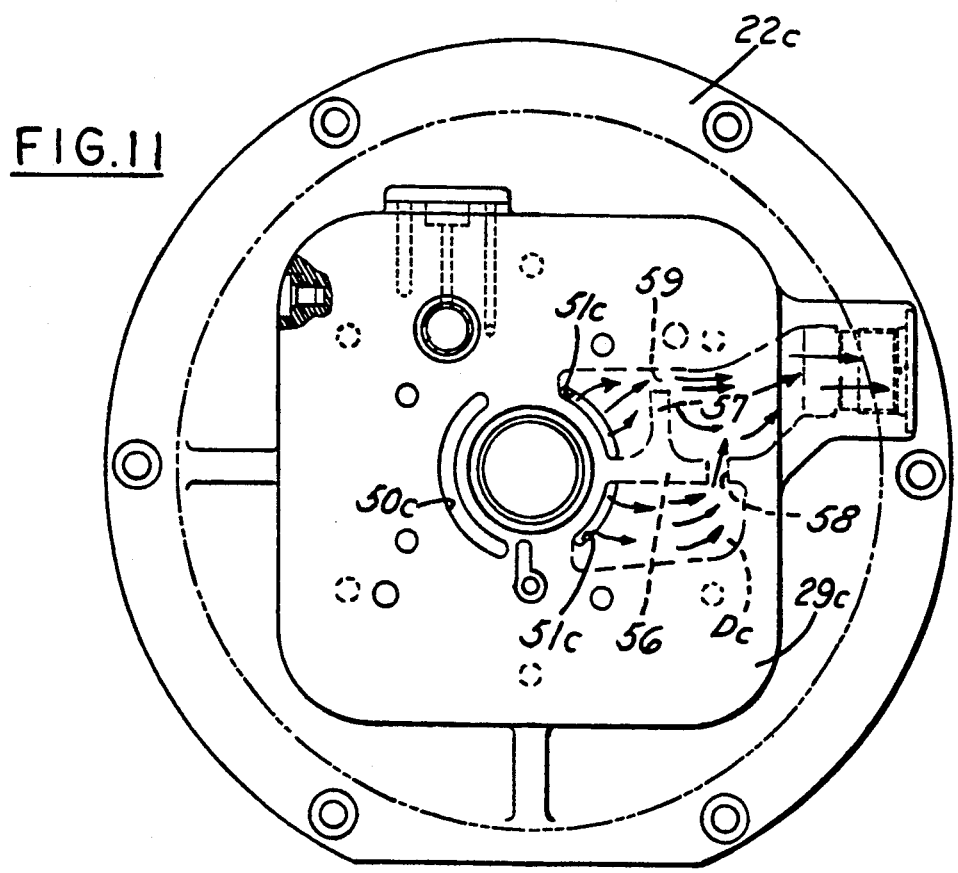
FIG. 11 is a view similar to FIG. 8 of a further form of end member.

As shown in the FIG. 11, the end member 22c includes a valving surface and an inlet 50c and outlets 51c and is similar to that shown in FIG. 10 and including a relatively smaller chamber Dc with a wall 56 and a wall 57 defining an orifice 58, 59 that function to reduce the fluid-borne noise as the rotating group of the pump rotates from one position to another in a sinusoidal fashion which causes a pulsating pressures.

Thus, each end member has an enlarged inlet chamber C and an enlarged discharge chamber D which may be in accordance with FIGS. 8-11.

Figure 2:
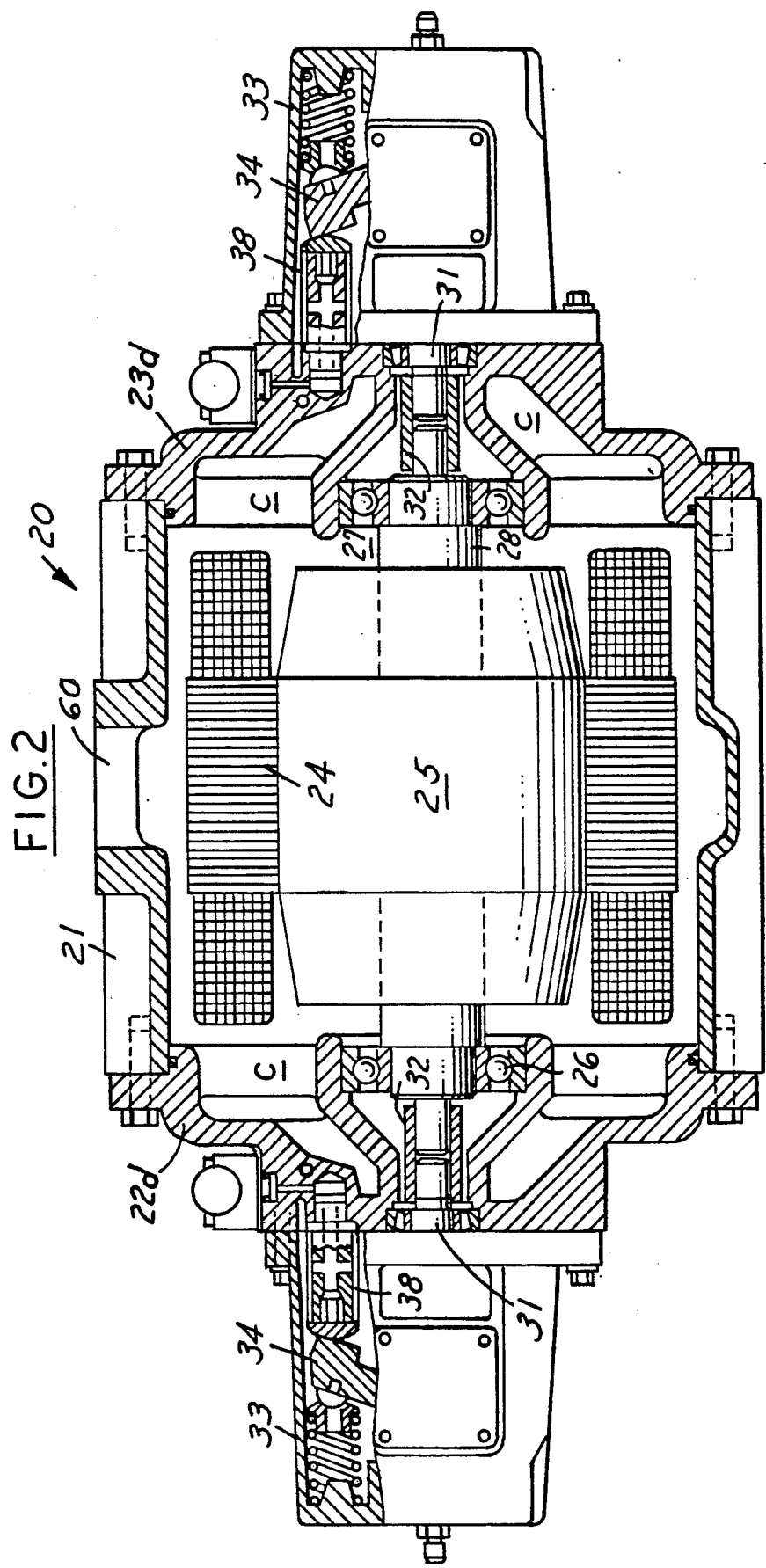
FIG. 2 is a longitudinal part sectional view of a modified form of apparatus.

In the form shown in FIG. 2, a variable delivering piston pump is integrated with each end member 22d, 23d and a central fluid inlet 60 is provided on the housing. Each of the variable delivery piston pumps is of the well know type such as shown in U.S. Pat. No. 2,845,876, incorporated herein by reference. Thus, the variable delivery piston pump comprises a movable yoke 34 which can be changed in its angular position to determine the stroke of the pistons in the cylinder block. The yoke 34 is controlled by a pump stroke control piston 38 which positions the yoke 34 to provide desired displacement. A stroke return spring returns the yoke 34 to maximum displacement position when the control piston is deactivated. A stroke control valve, not shown, controls the activation of the control piston 38.

Figure 3:
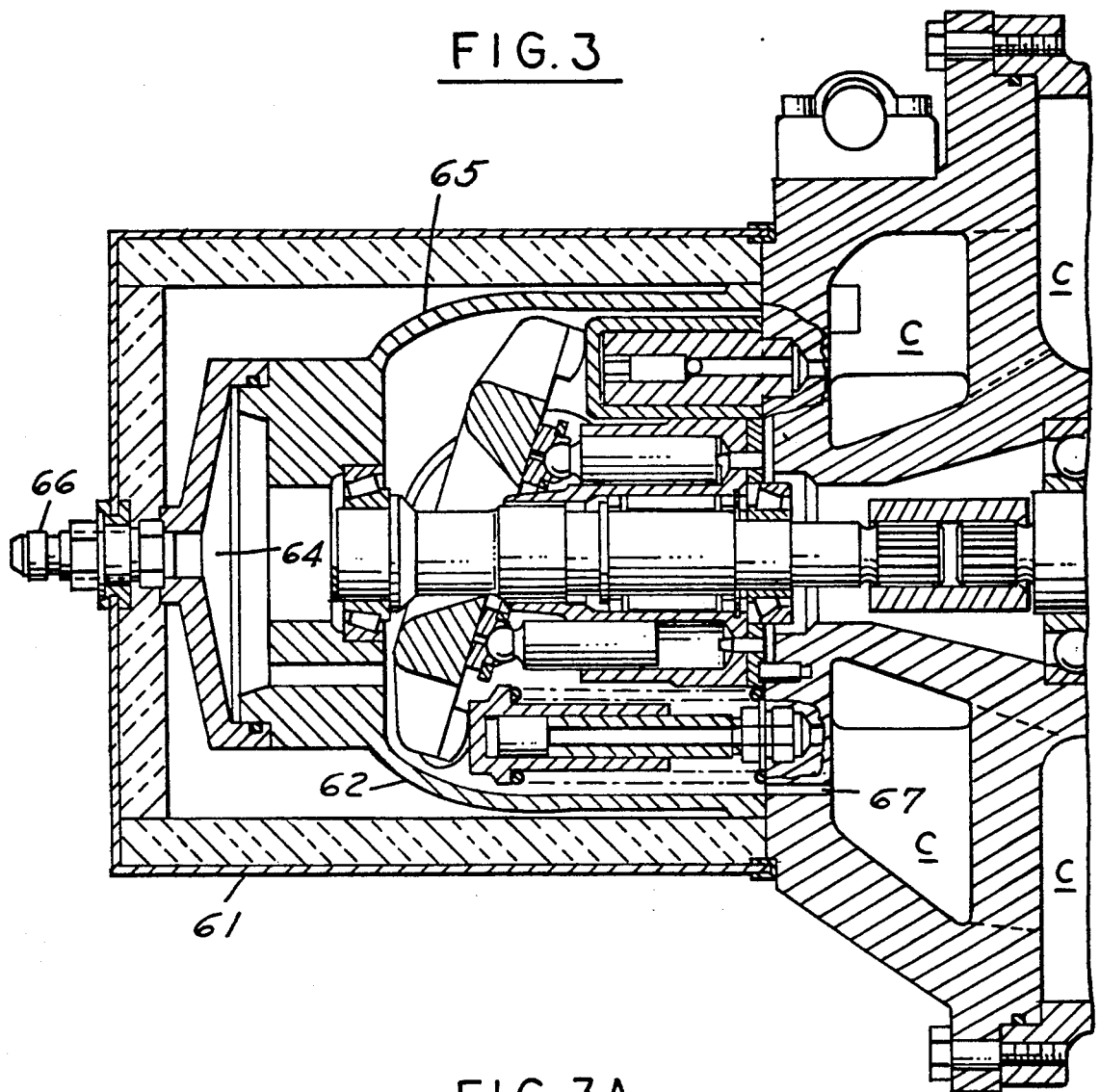
FIG. 3 is a fragmentary part sectional view of a further modified form of the invention.

In the form shown in FIG. 3, a noise insulated canister 61 is provided over the rotating frame of the pump to further reduce the air-borne noise level. The variable delivery pump 62 is of conventional construction and includes a head 64 that receives fluid from the interior of the housing 65 of the pump and permits it to pass through an outlet 66 to drain or tank so that the functioning of the pump is not adversely affected. Preferably a passage 67 communicates with the interior of the housing of the motor so that 9 small amount of hydraulic fluid continuously passes about the periphery of the rotating group to drain or tank so that when the pump is in a non-pumping position the hydraulic fluid about the electric motor will not be heated but will flow in a predetermined amount dissipating any heat that might be created by rotation of the electric motor and the destroked pumps when no hydraulic fluid is being discharged.

Figure 3A:
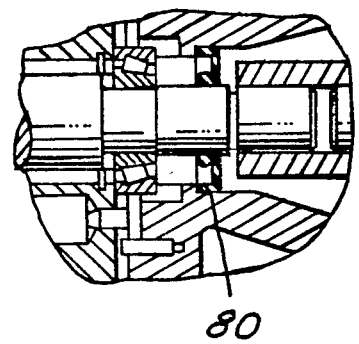
FIG. 3A is a fragmentary sectional view of a modified form of apparatus.

In the form shown in FIG. 3A, a shaft seal 80 of the U-type is provided about the shaft so that any leakage from the pump will not return to the end member but will be forced to leave through the outlet 66. The variable delivery piston pump is substantially like that shown in FIG. 2 except that a stroke bias piston is provided in place of the return spring.

In the form shown in FIGS. 4 and 5, a gear pump is integrated with the electric motor. The gear pump comprises meshing interengaging gears that function in a manner well known in the art such as U.S. Pat. No. 3,778,202 incorporated herein by reference. The end member 22f is provided with enlarged inlet chambers 70 communicating with the inlets to the gear pump and a large outlet chamber 71 which function in the same manner as the expansion chambers of the other forms of the invention.

Figure 7:
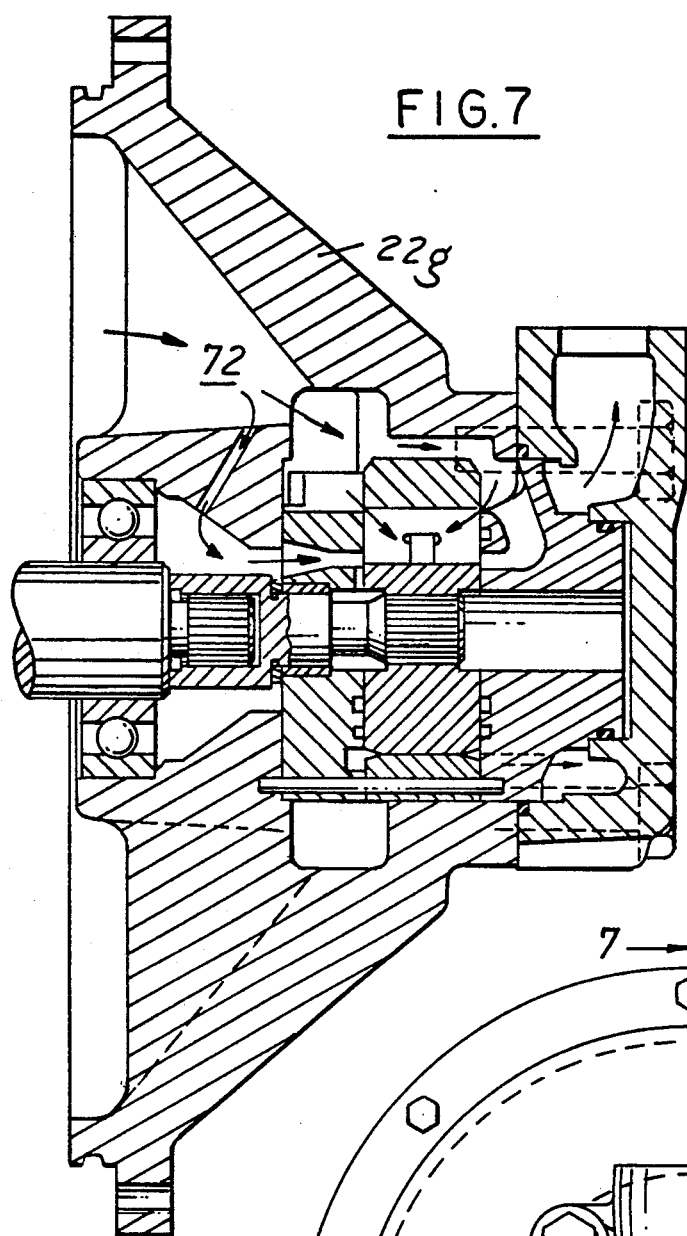
FIG. 7 is a sectional view taken along the line 7—7 in FIG. 6.
Figure 6:
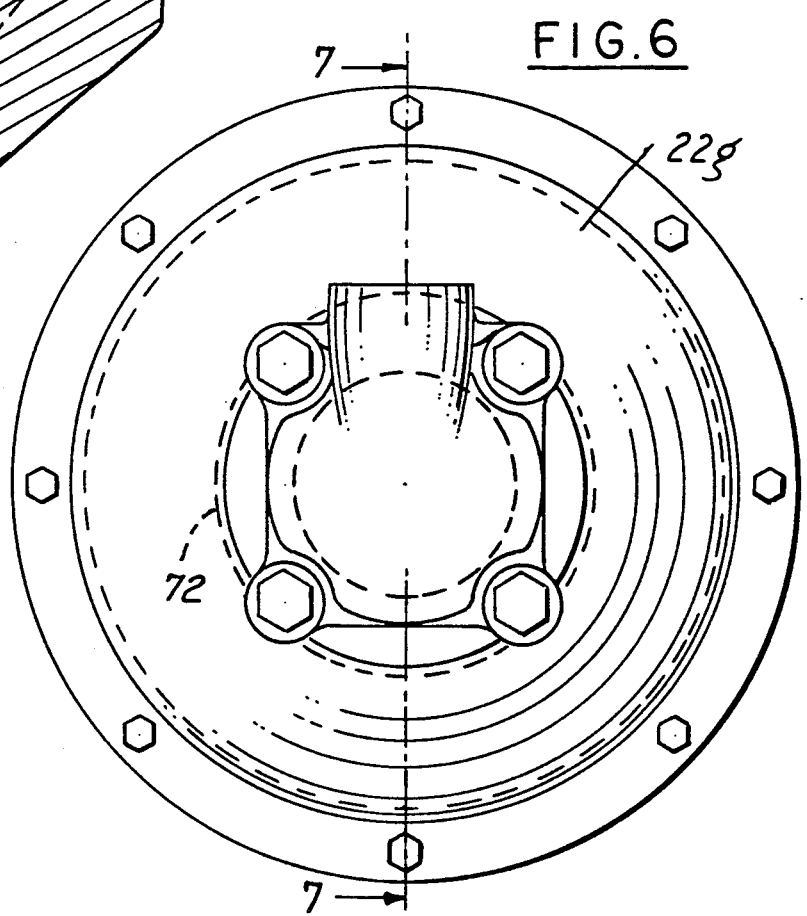
FIG. 6 is an end view of another form of the invention.

In the form shown in FIGS. 6 and 7, a vane pump is integrated with the electric motor. The vane pump is of well known construction such as shown in U.S. Pat. No. 4,505,654. The end member 22g incorporates a large inlet chamber 72 in a manner similar to the other forms previously described.

Among the advantages of the fluid cooled integrated electric motor/hydraulic pump assemblies utilized in the present invention are:

1. Compared to a conventional electric motor, the fluid cooled motor is capable of operating with lower temperatures at the electric components. These lower temperatures permit the electric motor to operate for longer periods at overload conditions.

2. The fluid is a more efficient heat transfer agent, compared to air, and conducts the generated heat to the electric motor case where it is more readily dissipated by radiation and/or convection. In the conventional air cooled electric motor, the temperature difference between the stator windings and the motor housing is relatively large because the air is a very poor heat conductor, compared to most fluids.

3. The resulting lower temperature at the electric motor windings and the fluid emersion reduces oxidation at the windings and the life of the deposited insulation on the wires is increased 4. The integration of the electric motor/hydraulic pump provides the following cost savings and improved performance features:
4.1: Sharing of the electric motor shaft and bearings to drive the hydraulic pump.
4.2: Elimination of the shaft seal.
4.3: Elimination of the shaft coupling.
4.4: Elimination of a separate pump mounting bracket.
4.5: Possible elimination of the electric motor fan and shroud.
4.6: Smaller package occupies less floor space.
4.7: Sharing of common structural components.

5. The elimination of the pump mounting brackets which reduces the noise radiating surfaces.

6. Utilization of the inherently larger size of the electric motor end members to provide reinforcement support for containing hydraulic pump components.

7. Utilization of the inherently large size of the electric motor to provide space for locating expansion chambers for reducing the fluid borne noise of the pump discharge.

It can thus be seen that there has been provided a combined electric motor and pump which has the aforementioned advantages but, in addition, permits the pump to be entirely submerged within the hydraulic fluid interior of the housing; wherein a pump is integrated into one or both end members of the electric motor housing; wherein the electric motor housing and end member are constructed and arranged to stabilize and condition the flow of hydraulic fluid into the pump; and wherein the pump may comprise a piston pump, vane pump or gear pump, or combinations thereof; which is applicable to electric motors of various types such as induction electric motors, permanent magnet motors, brushless motors; and which can be adapted to various startup and speeds, rotor position, pressure and fluid temperature sensing.

We claim:

1. An electric motor driven inline hydraulic apparatus comprising:
a housing having opposed open ends,
an electric motor stator mounted in said housing,
an end member closing each open end of said housing,
a shaft journaled for rotation in said end members,
an electric motor rotor mounted on said shaft,
a hydraulic rotating group,
at least one of said end members having portions cooperating with said rotating group to define a pump with said one end member providing direct axial support of pump hydrostatic forces generated by said rotating group,
means coupling said shaft to said rotating group,
said one end member having inlet passages from the interior of said housing to said rotating group,
means defining an inlet to said housing such that fluid supplied to said inlet flows about said stator and rotator to said rotating group, and
means defining an outlet from said rotating group,
said one end member associated with said rotating group having an enlarged inlet chamber communicating directly with the interior of the housing such that a large mass of relatively quiescent fluid is provided adjacent inlet passages to the rotating groups.

2. The electric motor driven inline hydraulic apparatus set forth in claim 1 wherein said one end member has an enlarged discharged chamber communicating with the outlet of said rotating group providing a relatively quiescent body of fluid adjacent said outlet.

3. An electric motor driven inline hydraulic apparatus comprising
a housing having opposed open ends,
an electric motor stator mounted in said housing,
an end member closing each open end of said housing,
a shaft journaled for rotation in said end members,
an electric motor rotor mounted on said shaft,
a hydraulic rotating group,
at least one of said end members having portions cooperating with said rotating group to define a pump with said one end member providing direct axial support of pump hydrostatic forces generated by said rotating group,
means coupling said shaft to said rotating group,
said one end member having inlet passages from the interior of said housing to said rotating group,
means defining an inlet to said housing such that fluid supplied to said inlet flows about said stator and rotor to said rotating group, and
means defining an outlet from said rotating group,
said one end member having an enlarged discharge chamber communicating with the outlet of said rotating group providing a relatively quiescent body of fluid adjacent said outlet.

4. The electric motor driven inline hydraulic apparatus set forth in claim 3 wherein said one end member associated with said rotating group comprises an enlarged inlet chamber communicating directly with the interior of the housing such that a large mass of relatively quiescent fluid is provided adjacent inlet passages to the rotating group.

5. The electric motor driven inline hydraulic apparatus set forth in claim 2 or 3 wherein said rotating group has plural outlets in said end member and said discharge chamber receives fluid from said plural outlets.

6. The electric motor driven inline hydraulic apparatus set forth in claim 1 or 3 wherein said other end member has portions cooperating with a second rotating group to define a second pump, with said other end member providing direct axial support of pump hydrostatic forces generated by said second rotating group,
means coupling said shaft to said second rotating group, said other end member having inlet passages from the interior of said housing to said second rotating group, and means defining an outlet from said second rotating group.

7. The apparatus set forth in claim 1 or 3 wherein said housing and end members include first bearing means for rotating supporting said shaft and said rotor, and wherein said at least one end member has second bearing means supporting said rotating group independent of said first bearing means.

8. The electric motor driven inline hydraulic apparatus set forth in claim 1 or 3 including means defining an outlet for leakage fluid from said rotating group to said exterior of said housing.

9. The electric motor driven inline hydraulic apparatus set forth in claim 8 including means isolating flow of said leakage from the interior of said housing.

10. The electric motor driven inline hydraulic apparatus set forth in claim 9 wherein said isolating means comprises a shaft seal in said end member.

11. The electric motor driven inline hydraulic apparatus set forth in claim 8 including a sound insulating housing about said rotating group, said sound insulating housing having said leakage outlet therethrough.

12. The electric motor driven inline hydraulic apparatus comprising a housing having opposed open ends, an electric motor stator mounted in said housing, an end member closing each open end of said housing, a shaft journaled for rotation in said end members, an electric motor rotor mounted on said shaft, a hydraulic rotating group, at least one of said end members having portions cooperating with said rotating group to define a pump, means coupling said shaft to said rotating group, said one end member having inlet passages from the interior of said housing to said rotating group, means defining an inlet to said housing such that fluid may be supplied and flow about said stator and rotor to said rotating group, and means defining an outlet from said rotating group, said rotating group having plural outlet passages in said one end member and said outlet-defining means including a discharge chamber that receives fluid from said plural outlet passages.

13. The electric motor driven inline hydraulic apparatus set forth in claim 12 including a sound insulating housing about a said rotating group, said sound insulating housing having a said leakage outlet therethrough.

14. The electric motor driven inline hydraulic apparatus set forth in claim 19 wherein said discharge chamber comprises a chamber in which fluid flows form one of the outlet passages and merges with fluid from the other outlet passage before such fluid flows through the outlet of said apparatus.

15. The electric motor driven inline hydraulic apparatus set forth in claim 14 wherein said fluid flow from said one outlet passage moves through an arcuate path of over 180° before merging with the fluid from the other outlet passage.

16. The electric motor driven inline hydraulic apparatus set forth in claim 14 wherein said fluid from said outlet passages flows generally parallel before merging.

17. The electric motor driven inline hydraulic apparatus set forth in claim 16 including a pipe resonator tube associated with the outlet from said apparatus.

18. The electric motor driven inline hydraulic apparatus set forth in claim 16 including means in said end member defining an orifice associated with the flow from each said outlet passage prior to merging of the fluid flow.

19. The electric motor driven inline hydraulic apparatus comprising:

a housing having opposed open ends, an electric motor stator mounted in said housing, an end member closing each open end of said housing, a shaft journaled for rotation in said end members, an electric motor rotor mounted on said shaft, a hydraulic rotating group, at least one of said end members having portions cooperating with said rotating group to define a pump, means coupling said shaft to said rotating group, said one end member having inlet passages from the interior of said housing to said rotating group, means defining an inlet to said housing such that fluid may be supplied and flow about said stator and rotor to said rotating group, means defining a pump outlet from said rotating group, a conduit fitting forming an outlet for leakage fluid from said rotating group to the exterior of said housing and a sound insulating housing about said rotating group, said sound insulating housing being sealingly mounted to said one end member surrounding said rotating group and sealingly surrounding said leakage outlet fitting extending therethrough.

20. An electric motor driven inline hydraulic apparatus comprising a housing having opposed open ends, an electric motor stator mounted in said housing, an end member closing each open end of said housing, a shaft journaled for rotation in said end members, an electric motor rotor mounted on said shaft, a hydraulic rotating group, at least one of said end members having portions cooperating with said rotating group to define a pump, means coupling said shaft to said rotating group, said one end member having inlet passages from the interior of said housing to said rotating group, means defining an inlet to said housing such that fluid may be supplied and flow about said stator and rotor to said rotating group, means defining a outlet from said rotating group, and a sound insulating housing sealingly mounted to said one end member surrounding said rotating group, said sound insulating housing having an outlet fitting sealingly projecting therethrough for flow of leakage fluid from said rotating group.

21. An electric motor driven inline hydraulic apparatus comprising a housing having opposed open ends, an electric motor stator mounted in said housing, an end member closing each open end of said housing, a shaft journaled for rotation in said end members, an electric motor rotor mounted on said shaft, a hydraulic rotating group,
at least one of said end members having portions cooperating with said rotating group to define a pump with said one end member providing direct axial support of pump hydrostatic forces generated by said rotating group,
means coupling said shaft to said rotating group,
said one end member having inlet passages from the interior of said housing to said rotating group,
means defining an inlet to said housing such that fluid supplied to said inlet flows about said stator and rotor to said rotating group, and
means defining an outlet from said rotating group,
said housing and end members having first bearing means for rotatably supporting said shaft and said rotor, said at least one end member having second bearing means supporting said rotating group independent of said first bearing means.

22. The apparatus set forth in claim 21 wherein said means coupling said shaft to said rotating group comprises a pump shaft rotatably coupled to said rotating group, said second bearing means being disposed on said at least one end member supporting said pump shaft on opposite sides of said rotating group, and means coupling said pump shaft for corotation with said electric motor shaft.

23. The electric motor driven inline hydraulic apparatus set forth in any one of claims 1-2, 14-18, 9-13, 12-20, 22-21 wherein said rotating group comprises a rotating group for a piston pump.

24. The electric motor driven inline hydraulic apparatus set forth in any one of claims 1-2, 14-18, 9-13, 12-20, 22-21 wherein said rotating group comprises a rotating group for a vane pump.

25. The electric motor driven inline hydraulic apparatus set forth in any one of claims 1-2, 14-18, 9-13, 12-20, 22-21 wherein said rotating group comprises a rotating group for a gear pump.

* * * * *